Patented July 14, 1936

2,047,919

UNITED STATES PATENT OFFICE 2,047,919

CELLULOSE ACETATE COMPOSITIONS

Paul La Frone Magill, Niagara Falls, N. Y., assignor to E. I. du Pont de Nemours & Company, Inc., Wilmington, Del., a corporation of Delaware No Drawing. Application November 16, 1934, Serial No. 753,371

3 Claims. (Cl. 106—40)

This invention relates to cellulose acetate solutions and more particularly to a solvent and blending agent for cellulose acetate compositions.

Known procedures for dissolving cellulose acetate include the use of such materials as aliphatic ketones and esters and/or various of the chlorinated hydrocarbons as solvents. Such solvents do not, as a rule, dissolve other oxygenated chemical substances occurring widely in nature and differing markedly in type and structure from cellulose acetate.

An object of this invention is to provide a solvent for cellulose acetate which readily dissolves at the same time many other types of organic materials. Other objects will appear hereinafter.

These objects are accomplished by using formamide alone or combined with other materials as a solvent. This use of formamide is illustrated by the following examples:

Example 1

Three grams of cellulose acetate were mixed cold with 25 cc. of formamide and the mixture heated to 120–140° C. On cooling, a clear, viscous solution resulted which was capable of dissolving further quantities of cellulose acetate.

Example 2

Twelve grams of formamide and 1.5 grams of cellulose acetate were mixed cold and warmed to bring about solution. 6.25 grams of casein were dissolved in 25 cc. of formamide and the casein solution mixed at 100° C. with the cellulose acetate solution. A clear, viscous solution resulted.

Example 3

370 grams of formamide, 15 grams of cellulose acetate, 62.5 grams of casein and 100 cc. of methanol were mixed and brought to a uniform solution by heating. 20.5 grams of this solution were mixed with 5 grams of lampblack. The resulting product when cooled was a smooth, intensely black, viscous mass.

Various modifications in the properties of the formamide-cellulose acetate solutions may be effected by incorporating therein additional materials soluble in formamide such as starch, dyes, glue, gelatine, dextrin and albumin and/or other materials, e. g., oils and waxes.

These compositions have valuable properties for such uses as textile coatings and impregnating media, leather dressings, printing inks, paints, adhesives, plastics and many other uses.

Claims:
1. A composition of matter comprising cellulose acetate, formamide and casein.
2. A composition of matter comprising cellulose acetate, formamide, casein and a pigment.
3. A composition of matter comprising cellulose acetate, formamide, casein, methanol and a pigment.

PAUL LA FRONE MAGILL.